United States Patent [19]
Tullis et al.

[11] Patent Number: 5,439,494
[45] Date of Patent: Aug. 8, 1995

[54] SELF-CLEANING GAS FILTERING APPARATUS

[76] Inventors: Charles G. Tullis; Bobby A. Hammer, both of P.O. Box 150128, Longview, Tex. 75615

[21] Appl. No.: 282,873
[22] Filed: Jul. 29, 1994
[51] Int. Cl.⁶ .............................................. B01D 46/00
[52] U.S. Cl. ...................................... 55/283; 55/287; 55/294; 95/20; 95/279
[58] Field of Search ................. 55/283, 284, 285, 286, 55/287, 294, 302, 303; 95/20, 279, 280

[56] References Cited

U.S. PATENT DOCUMENTS

| | | | |
|---|---|---|---|
| 3,280,980 | 10/1966 | King | 55/284 |
| 3,423,905 | 1/1969 | Chambers | 55/294 |
| 4,154,589 | 5/1979 | Crawford et al. | 55/294 |
| 4,233,041 | 11/1980 | Noland | 55/287 |
| 4,373,939 | 2/1983 | Limbocker | 55/294 |
| 4,781,825 | 11/1988 | Grimes et al. | 55/302 |

*Primary Examiner*—C. Scott Bushey
*Attorney, Agent, or Firm*—Charles W. Alworth; Ronald B. Sefrna

[57] ABSTRACT

An improvement to self-cleaning gas filters, gas filter-separators or gas filter-coalescer devices. The improvement reduces the waste of gas during a self-cleaning cycle by a series of mechanical refinements to the internal seals, by improving the manufacturing steps, and by considering gas waste if the internal elements are damaged, during the cleaning cycle, by controlling the reverse gas flow based on differential pressure across the elements that are being cleaned. Some of the improvements are field retrofitable to existing devices whereas other improvements can only be made to the present art during the manufacturing phase.

14 Claims, 20 Drawing Sheets

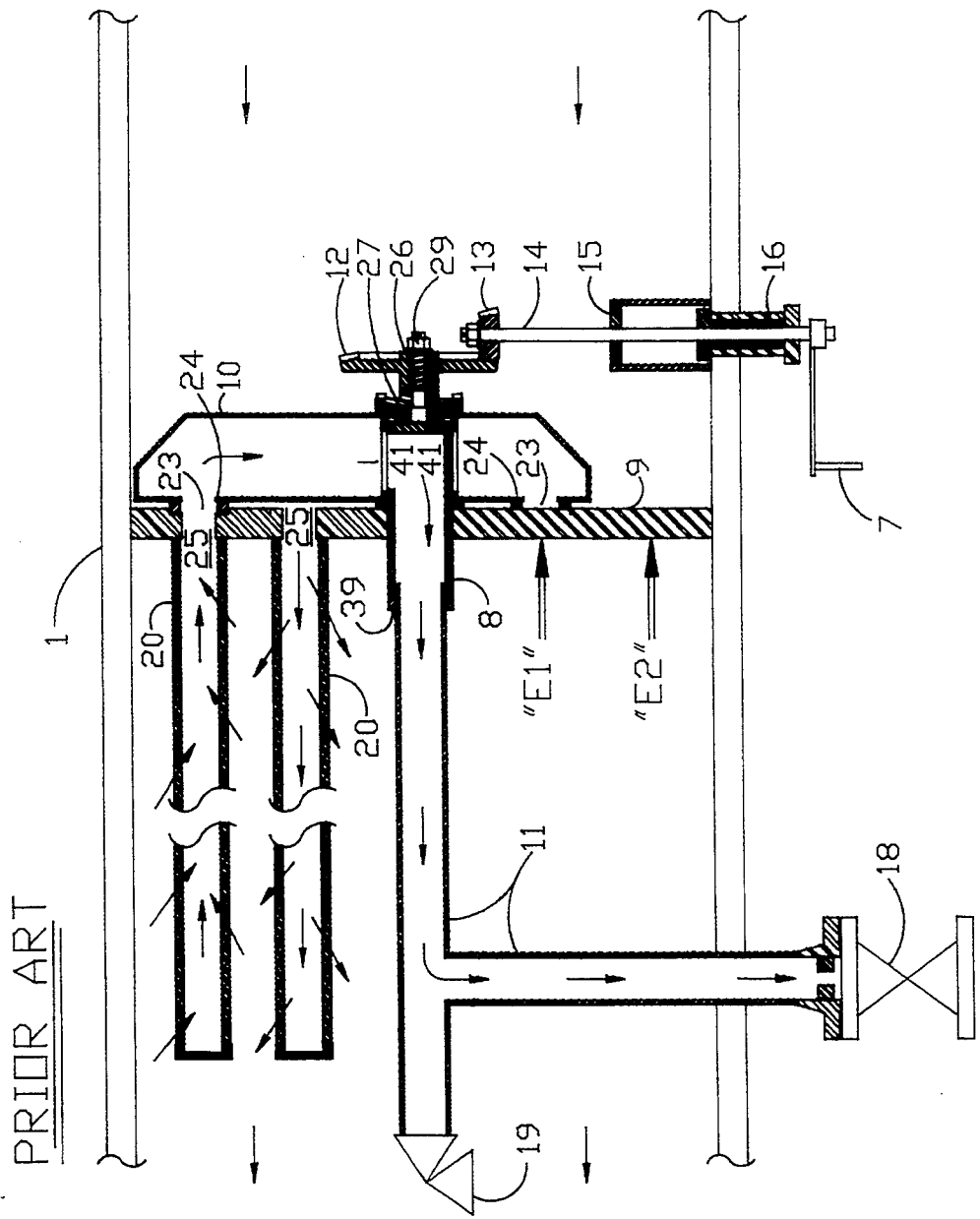

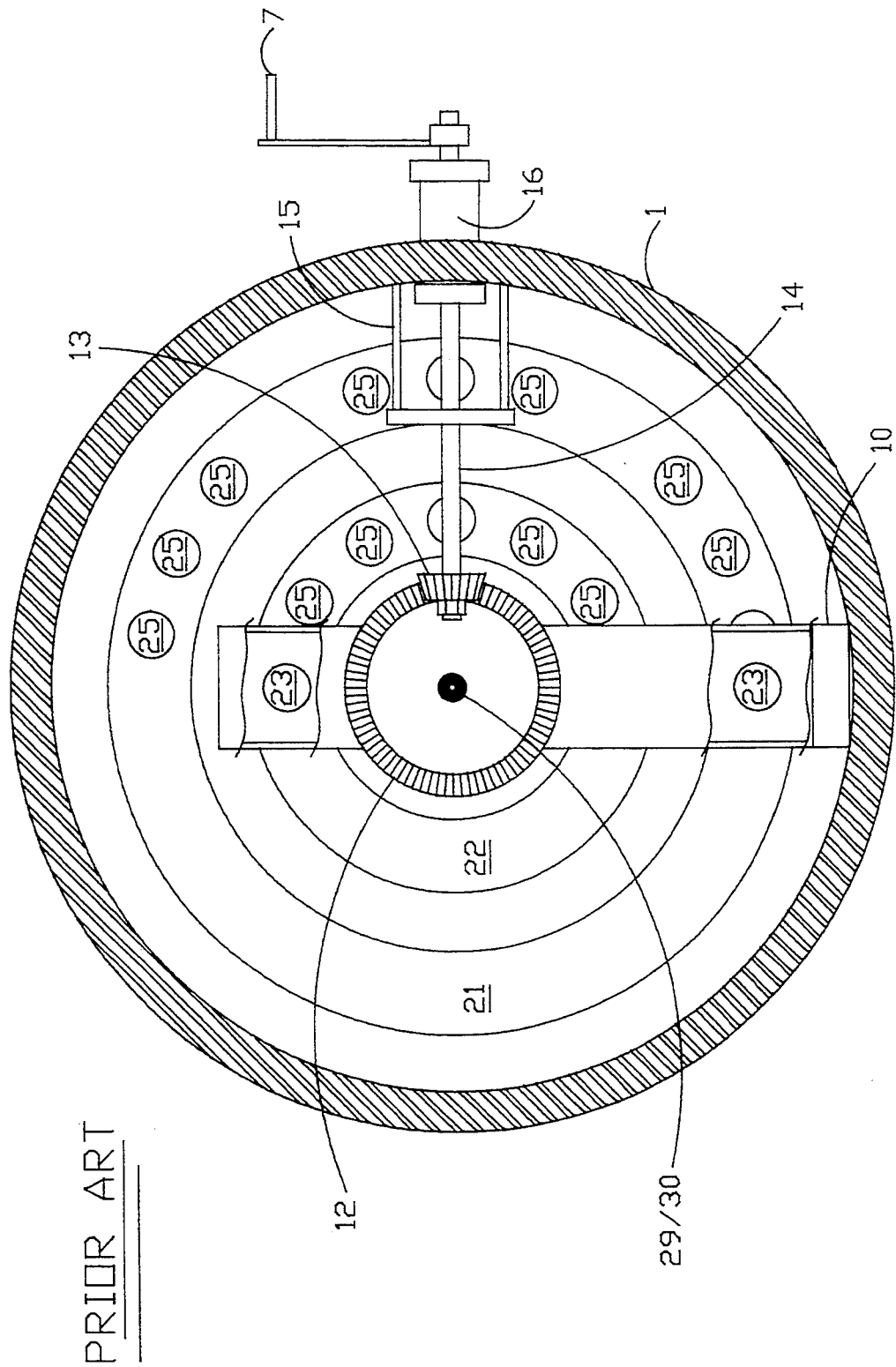

SELF-CLEANING GAS FILTERING APPARATUS

TECHNICAL FIELD OF THE INVENTION

This invention relates to the oil, chemical processing and refining industry and in particular to an apparatus used to filter and/or de-mist natural or synthetic gases.

BACKGROUND OF THE INVENTION

Gas filtering and de-misting devices have been used for many years. There are roughly three fundamental types of apparatus used to filter gas; that is, to remove solid impurities from a gas stream. The same apparatus can be used to de-mist gas; that is, remove (or lower) the entrained liquids found in gas produced and used within the process industries (which includes natural gas production, oil production—with produced-gas, and refining).

Basically the dirty wet gas is passed through a sealed pressure vessel called a filter-separator which can be a horizontal or a vertical vessel depending on site requirements. If the gas is perfectly dry, there is no need for separation, only filtration. But, normally, both steps are performed within a single filter-separator. Traditionally, separation of entrained liquids from the gas is performed in one of three ways:

a wire mesh impingement device within the vessel,
a centrifugal impingement device within the vessel, or
a vane type impingement device within the vessel.

With the advent of newer materials, there is now a fourth method which combines the filter and an impingement device to allow the entrained liquids to coalesce within the filter and along the filter boundaries. This process is called "reverse flow filtering and mist coalescence". The term "reverse flow" comes from the fact that the gas flows backward through the filter rather then forward through the filter as used in the standard filter-separator. This terminology is somewhat important because standard filters are supported by an internal structure and in forward flow the filter is pressed against that support structure. In reverse flow, the filter is pulled away from the support structure and the filter must be capable of carrying the imposed mechanical load. That load would be related to force (differential pressure drop across the filter) and area. The elements in a filter-coalescer serve two purposes, the first being a filter and the second being the area over which the entrained liquid can coalesce. If the rate of flow of the gas over the element is kept within a reasonable low flow, then the liquid droplets which form within the element and along the boundaries of the element will not be picked up by the gas and carried out of the vessel. These droplets are allowed to fall (under gravity) to the bottom of the vessel and are removed using standard liquid level control processes.

Reverse flow filter-coalescers appeared in the industry in the 1960's and standard filters and filter-separators came of age after the Second World War, although the concepts had been practiced long before by industry. One of the problems associated with both types of elements, used in these devices, is found in their filtration function. After a period of time, the filter traps so much material that the filter is no longer efficient and it stops working. The element must be replaced. Traditionally, this meant that the filter separator had to be taken out of service: an operation that can be intolerable to a chemical process. It is possible to have two such vessels, one in service and one in standby. However, if large amounts of gas need to be filtered or de-misted, the pressure vessel is subsequently large and the cost for two vessels can be prohibitively high. Thus, two such vessels are rarely found in the industry.

PRIOR ART

In the early 1970's, the oil and gas industry starting using self-cleaning filters, self-cleaning filter-separators and/or self-cleaning filter-coalescers. These devices allowed the operator or user of a self-cleaning device, be it a filter-separator (which includes filter-coalescers) or a plain filter, to "back-flow" an element (or elements depending on the design) within the pressure vessel in such a manner that the entrapped impurities in the element(s) could be removed without taking the pressure vessel out of service.

In the self-cleaning device, there is an internal manifold which rotates within the vessel and covers up one (or more) element entry-ports. The manifold has a series of pads, containing an opening, which glide over element entry-ports, sealing a particular entry port from the normal flow of gas. The manifold is in communication with a valve that leads to the atmosphere or a reduced pressure vessel. When the valve is opened, the pressure within the main pressure vessel forces gas backward through the element(s) being cleaned, into the manifold, through some internal isolated piping, and through the valve to atmosphere or to a second reduced pressure vessel. This gas back flow, which occurs at a very high flow rate due to the pressure gradient, picks up and carries away the entrapped materials within the element(s). When the first self-cleaning devices were marketed, gas was cheap and regulations were essentially non-existent; thus, the back flow cleaning gas was generally vented to flare and burned. Today, the gas is passed through a bath to catch the impurities and then, generally, flared.

Because gas was cheap, the designers, builders, and users of the early self-cleaning devices did not concern themselves with waste of gas within the vessel. That is, the manifold pads were designed to glide over the ends of the entry-ports to the individual elements and make a reasonable seal; but, it was unimportant if gas escaped around or between the pad and the entry-port. As the price of gas has increased, this waste has become important and a need has arisen to reduce the clearances around the entry-ports and manifold pads to reduce waste.

In the meantime, the filter-coalescer has found increasing use in burner operations because of changes in air quality regulations which require that NOx and other pollutants be dramatically reduced. It is known that clean dry gas burns with very little pollutants. Burner operations are found in evened process industry; for example, electric utility, refining, chemical, paper, etc. The self-cleaning filter-coalescer (and self-cleaning filter for dry, gas) is finding enhanced use daily as these air quality regulations become more strict. Also, it has become possible to burn "sour" gas (gas containing hydrogen sulphide) in some of these operations and these self cleaning device must now be capable of operating with sour gas.

The self cleaning operation need only be performed when the differential pressure across the device indicates that element efficiency is falling off because the elements are filling with particles. Thus, the internal manifold may remain stationary for weeks or months at a time. In the early devices, which were not used in sour gas service, the lack of rotation made no difference. In sour gas service, corrosion of proven seal and bearing materials used in the internals of the pressure vessel will occur and the manifold has been known to become stuck in place. The word proven is used above because the industry is very reluctant to change seal designs and materials; however, an improvement to the seals and bearing used in these devices is long overdue. Finally, many of the early self cleaning devices will allow the backward cleaning gas flow to move too rapidly which will cause the element being cleaned to fracture and become inoperative. A solution to this problem is also long overdue.

Thus, there remains in the art a need for an improvement to the self-cleaning filter, self-cleaning filter-separator, and/or self-cleaning filter-coalescer which will reduce the waste of element cleaning gas, improve the internal seal and bearing surfaces to operate in a sour gas environment, and allow for back-flushing differential control to protect the element being cleaned from damage.

SUMMARY OF THE INVENTION

The invention is an improvement to the present art in self-cleaning filters, self-cleaning filter-separators, and-/or self-cleaning filter-coalescers and resolves the problems described above. In order to be able to understand and follow these improvements, some notion as to the general design and operation of these devices is required. Essentially, a gas filter, filter-separator, and/or a filter-coalescer consists of a pressure vessel; an internal support plate, to support the filter and/or coalescer elements; a manway, to allow access to the elements; an inlet, for the dirty and/or wet gas; an outlet, for the clean and/or dry gas; an outlet and block valve, for the back flow cleaning gas; and a rotatable manifold, which allows each element to receive back flowing gas when selected to do so. The internal support plate has a number of element entry-ports formed in the plate through which the normally forward flowing gas passes on its way to and through an element. The rotatable manifold is capable of blocking a "set of entry-ports" from the forward flowing gas and allowing the pressured gas, within the vessel, to flow backwards through a given set of elements, through the manifold, and to the back flow outlet on the pressure vessel. The term "set of entry-ports" is used because one or more ports can be blocked at one time. Two actions for self-cleaning must occur; the manifold must be over a set of entry-ports, and the back flow block valve must be open.

The rotatable manifold has a series of pads which ride on the support plate; each pad having a hole which permits the back flow gas to pass into the manifold. The manifold rotates about the central axis of the support plate on a combination pivot/seal system that allows the back flow cleaning gas to pass from the manifold to the back flow outlet via necessary internal piping. Thus, the manifold extends radially on both sides of the pivot located at the dead center of the support plate and perpendicular to the plate. The elements are arranged radially and perpendicular to the support plate but on the opposite side of the support plate to the manifold. Thus, the support plate divides the pressure vessel into two sections; an upstream (or dirty side) in which the manifold is positioned, and a downstream (or clean side) in which the elements are positioned. Due to the gas flow through the elements, there is a pressure difference across the support plate. The pads track across the face of the support plate in an arc centered about the pivot and tangentially to the manifold. The pads are kept against the face of the support plate by a spring within the central pivot and by the force imparted by the differential pressure between the upstream and downstream division within the pressure vessel.

Normally the manifold is positioned so that none of the element entry-ports are covered by any of the manifold pads. This means that all the gas flows into the vessel, through the elements, and out of the vessel via the outlet. When the differential pressure across the elements reaches a known value, it is time to clean the elements. The back flow block valve is opened and the manifold is rotated (by a hand crank or automatically) through 360 degrees. As the manifold rotates, back flow cleaning gas will pass through a set of elements, thus, sweeping the entrapped particulates backward through the manifold, the internal piping and outside the vessel. Of course, proper disposal of the back flow gas and particulates must be made.

It is known that the major source of waste in back flow gas occurs between the manifold pad(s) and the element support plate; that is, where the manifold pad(s) come in contact with each element entry-port. A simple solution to this problem would be to increase the area of the pad to provide a larger sealing surface. This simple approach would mean that element entry-ports would have to be spaced further apart which would increase the size of the pressure vessel and, as a consequence, the cost of the device. In the present device the greatest gas loss occurs in the radial direction across the face of the pad because this is the narrowest portion of the pad; this dimension being fixed by the placement of elements in the device. The face of the pad which is tangential to the manifold has the greatest dimension because it serves to valve off each element entry-port and thus the leakage in this direction is minimal. This "radial" leakage can be reduced by forcing the gas to take a more arduous path which may be accomplished by forming grooves in the element support plate within the main pressure vessel on which and in which the rotatable manifold pads glide. This means that gas which is attempting to leak in the radial direction must make two right angle turns within the short radial distance of the pad. The gas must make a single right angle turn in the tangential distance of the pad, but this dimension is much larger (generally one order of magnitude) and, as stated, the loss is small.

In the larger filter and/or separator devices the machine operation to cut grooves in the support plate can become very expensive and can distort the plate; hence, another concept must be used to reduce the loss. In these gas processing devices, the elements appear in even axial rows; that is, a device can contain two axial rows of elements, four axial rows, six axial rows, etc. The manifold is designed to operate in a pressure balanced condition over the element entry-ports. This means that the rotatable manifold will clean a set of entry-ports at each end of the manifold, about the central pivot point. This means that the spring load and the differential pressure force will equally hold each end of the manifold against the support plate.

In a filter-coalescer only one-half of the pressure vessel is full of elements. This allows the droplets to fall out of the coalescer elements and allows space for a de-mister which is generally placed within the other half of the device covering the outlet port. Thus, one end of the manifold will not pass over entry-ports during the self-cleaning operation and the pressure balance over each end of the manifold, described above, will not be present. Thus, gas can pass up under a manifold pad which is positioned over the unused half (the half without entry-ports) of the support plate and escape into the back flow line. This problem is resolved by adding a manifold blocking seal to the internal manifold cage; forming a single opening within the pivot tube, rather than the present art multiple cage openings; and positioning the single opening within the pivot tube on the support plate, so that gas coming only from a manifold pad over an entry-port can pass into the back flow line.

A further reduction in gas loss can be made by changing the normal manufacturing assembly procedure for the device. In the prior art, the pivot tube (about which the manifold rotates) is welded in place on the support plate before the support plate is welded into the main pressure vessel. Care is always taken to make certain that the pivot tube is perpendicular to the support plate. If the pivot tube is not perpendicular, then the manifold pad (or pads) will ride up away from the support plate and allow gas to escape. Unfortunately, the welding process which attaches the support plate to the main vessel often causes warping of the plate and subsequent movement of the pivot tube from perpendicular. The manufacturing improvement dramatically changes the assembly procedure by welding the support plate in place within the main pressure vessel and then welding the pivot tube in a perpendicular position. The increase in machine time and corresponding difficulty in tooling operations is worthwhile.

This improvement addresses the internal seal corrosion problem by changing the seal materials. The present art utilizes carbon steel seals. Carbon seals have been found to give satisfactory service (except in sour gas) because they are malleable and resistant to damage by entrained particles within the gas stream—particles that the elements are to remove. A change in seal material is not lightly undertaken in these devices because past experience has yielded satisfactory results and operators (users of the equipment) do not like to change horses in mid-stream. As the result of a number of tests and changes to the seal constraints, the malleable cast iron seal have been replaced with butyl rubber compound sold under the trade name of "Nitrile". A simple seal replacement is not possible because two of the former cast iron seals are load bearing, and tests of and changes to the seal constraints had to be made.

Finally, it has been observed that the elements were being destroyed by the rapid back flow of cleaning gas through an individual element during the cleaning cycles. Essentially, it was found that as the element "let go" of the entrained impurities, the rate of back flow substantially increased. Thus, in order to increase the life of the elements, a velocity pressure control was added to the back flow line. Essentially, the back flow velocity controller uses a differential pressure transmitter to sense the pressure across an element that is being cleaned. This is accomplished by sensing the internal pressure within the "clean" gas portion of the main pressure vessel and the pressure on the back flow line. A back flow velocity control valve, which is in series with the back flow cycle valve, is modulated by the differential pressure controller to keep the differential pressure across the element within its known back flow limitations.

BRIEF DESCRIPTION OF THE DRAWING

FIG. 4 is the prior art of FIG. 2.

FIG. 5 is the prior art of FIG. 3.

DESCRIPTION OF THE PREFERRED EMBODIMENT

Figure 1:
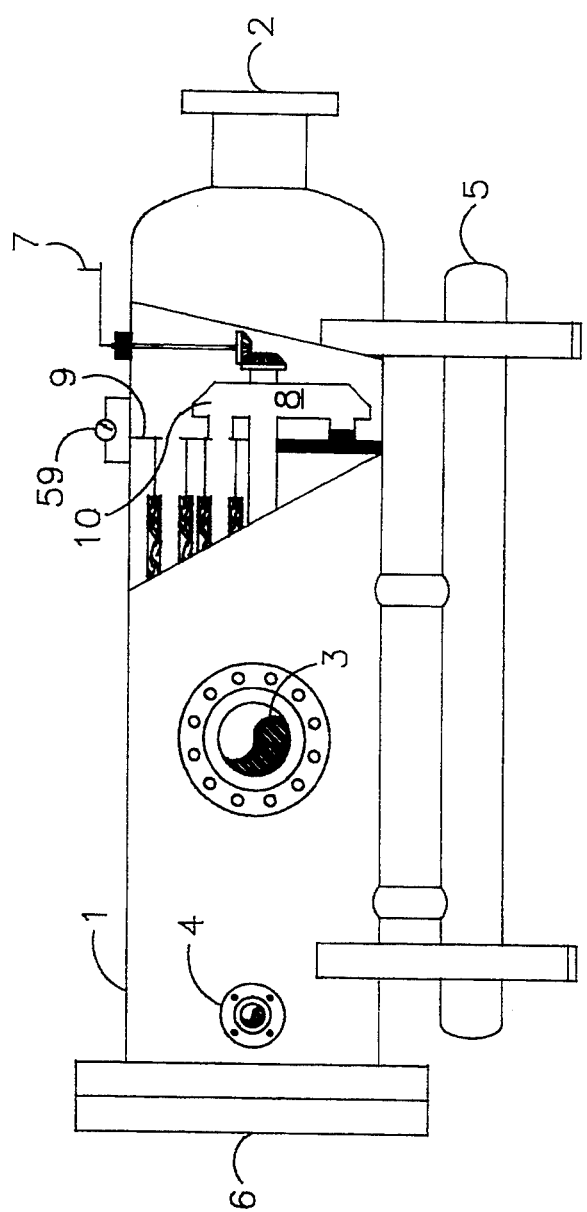
FIG. 1 shows a simple cut-a-way of a filter-coalescer illustrating the main parts found within the present art.

As stated in the summary of the invention, this invention is an improvement to the present art in self cleaning filters, self-cleaning filter-separators, and/or self-cleaning filter-coalescers and resolves the problems described above. In order to be able to understand and follow these improvements, some notion as to the general design and operation of these devices, as they currently exist, is required. FIG. 1 is a cut-a-way drawing of a filter-coalescer and is made up of a main pressure vessel, 1; an inlet nozzle, 2, through which the dirty/wet gas enters the vessel; an outlet nozzle, 3, through which the clean/dry gas exits the vessel; a back flow exit nozzle, 4, through which the back flow gas exits the vessel; a wet sump, 5, which holds the separated moisture for further processing; a manway, 6, for access to the coalescer/filter elements; a rotation means, 7, in this figure a hand crank for rotating the rotatable manifold, 10; a pivot tube, 8, about which the rotatable manifold, 10, can rotate; a support plate, 9, which divides the vessel into a clean and dirty side and supports the elements and the pivot tube; and a rotatable manifold, 10, which is in communication with the back flow nozzle and provides for selection of sets of elements to be cleaned.

The support plate has a number of element entry-ports located on two semi-circles about the pivot point. This arrangement can best be seen in FIG. 3, where the entry-ports, 25, are actually shown running along the center line of two semi-circular arcs taken about the central axis of the support plate. The manifold, 10, is shown blocking one element entry-port from normal gas flow. This particular blocked port is located on the inner arc of entry-ports, and, as the manifold is rotated through 180 degrees, successive entry-ports located on the inner arc are blocked from normal gas flow. The other end of the manifold, after rotating through 180 degrees, will block entry-ports located on the outer arc. A complete rotation of 360 degrees will put the manifold back to its original position, having cleaned all the elements within the vessel. The normal position for the manifold places it to one side of an entry-port so that no blockage of any entry port occurs. In large filter-coalescers, the manifold will cover "sets" of entry-ports (two or more at a time) which are located on alternate arcs about the pivot point at the center of the support plate.

It should be noted that the figures showing the support plates, elements and entry-ports are drawn for a filter-coalescer (and a standard filter-separator) in which elements are placed to one side and occupy one-half of the pressure vessel. The other half of the vessel is occupied by a de-mister (not shown) covering the exit nozzle or outlet port. In a filter, the filtration elements will be placed throughout the device and will be located on successive arcs taken about the central pivot point. Thus, both ends of the manifold will block entry-ports during the self-cleaning operation.

Figure 5A:
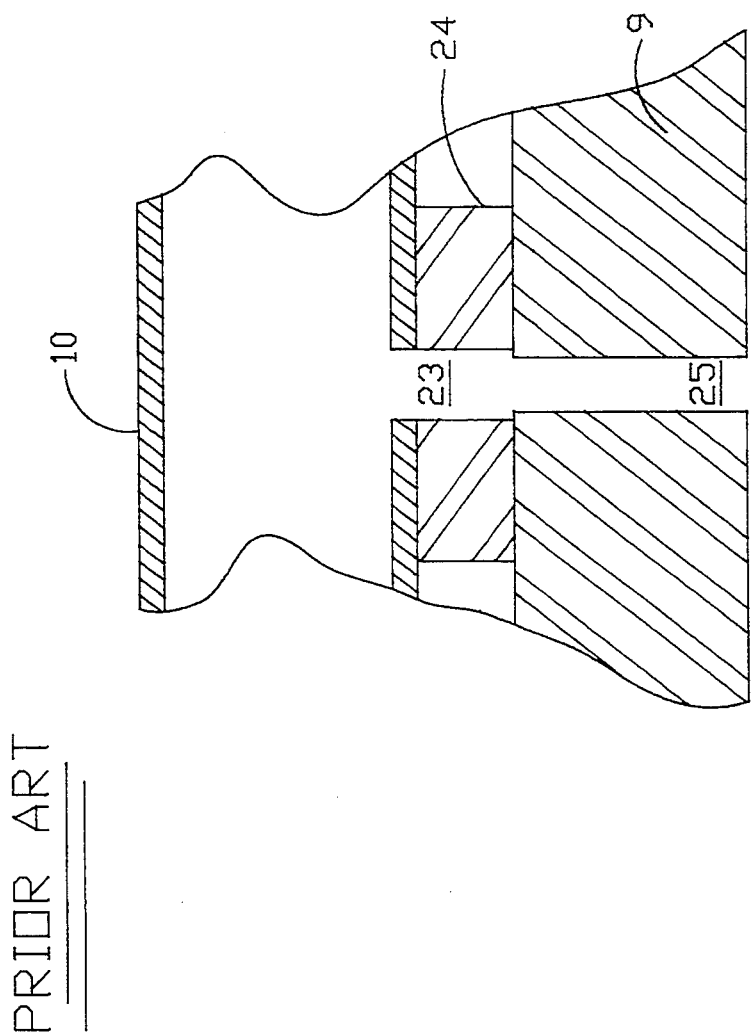
FIG. 5A is a cross-section taken through the manifold and the manifold pad showing the prior art approach.
Figure 5B:
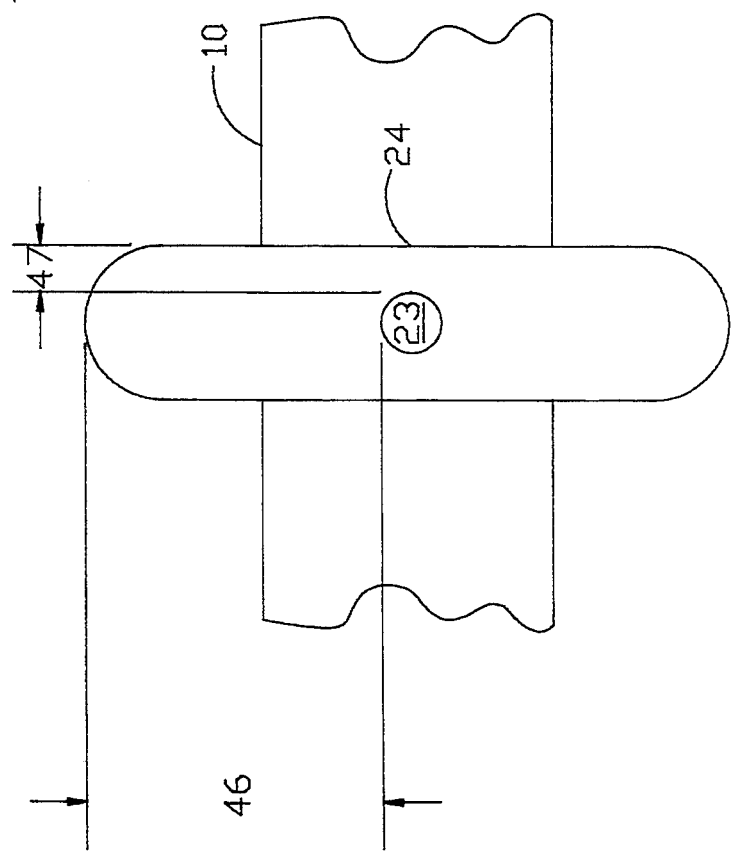
FIG. 5B is an enlarged plane view of the manifold pad mounted on the manifold showing the prior art approach.

The present art, shown in FIGS. 4 and 5 and represented in FIG. 1, will be used to describe the self-cleaning operation and the improvements offered by the instant invention. Self-cleaning functions very simply by allowing clean/dry gas to flow from the clean side of the element (the flow being backward to the normal flow), sweep up the particles on the dirty side of the element, and carry those particles outside the vessel. Mechanically this is accomplished by positioning an opening in the manifold over the entry-port to the element (or elements) to be cleaned, opening the back flow valve, and letting the clean gas flow backward. Unfortunately, the pad, 24, has limited area and dirty gas (that is the gas within the high pressure/dirty side of the vessel) can travel between the pad and the support plate. FIGS. 5A and 5B show a typical pad and illustrate dimensions defined in the radial and tangential direction. The radial dimension, 47, that is the distance between the pad opening, 23, and the edge of the pad, 24, is small when compared with the tangential dimension, 46. Thus, the greatest escape of gas will occur through the limited radial path. It would be possible to increase this dimension, but, if this is done, the overall dimensions of the pressure vessel will increase with a subsequent increase in cost. It is known that if gas is made to follow a tortuous path, pressure drops will occur, and less flow will occur along such a path.

Figure 2:
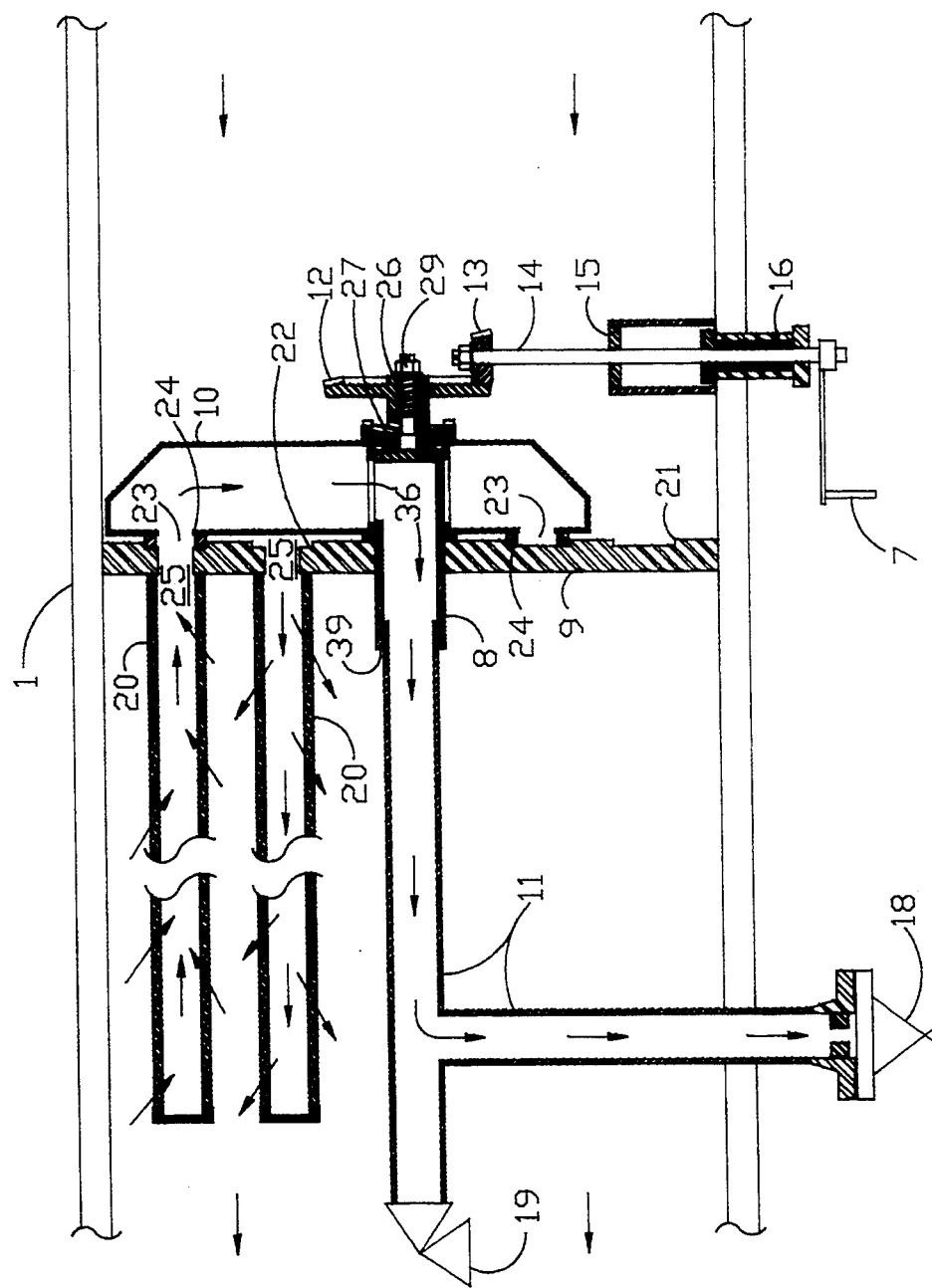
FIG. 2 shows improvements to reduce leakage between the manifold pads and the support plate. The same figure gives a representation of the back flow velocity control within the back flow piping.
Figure 3:
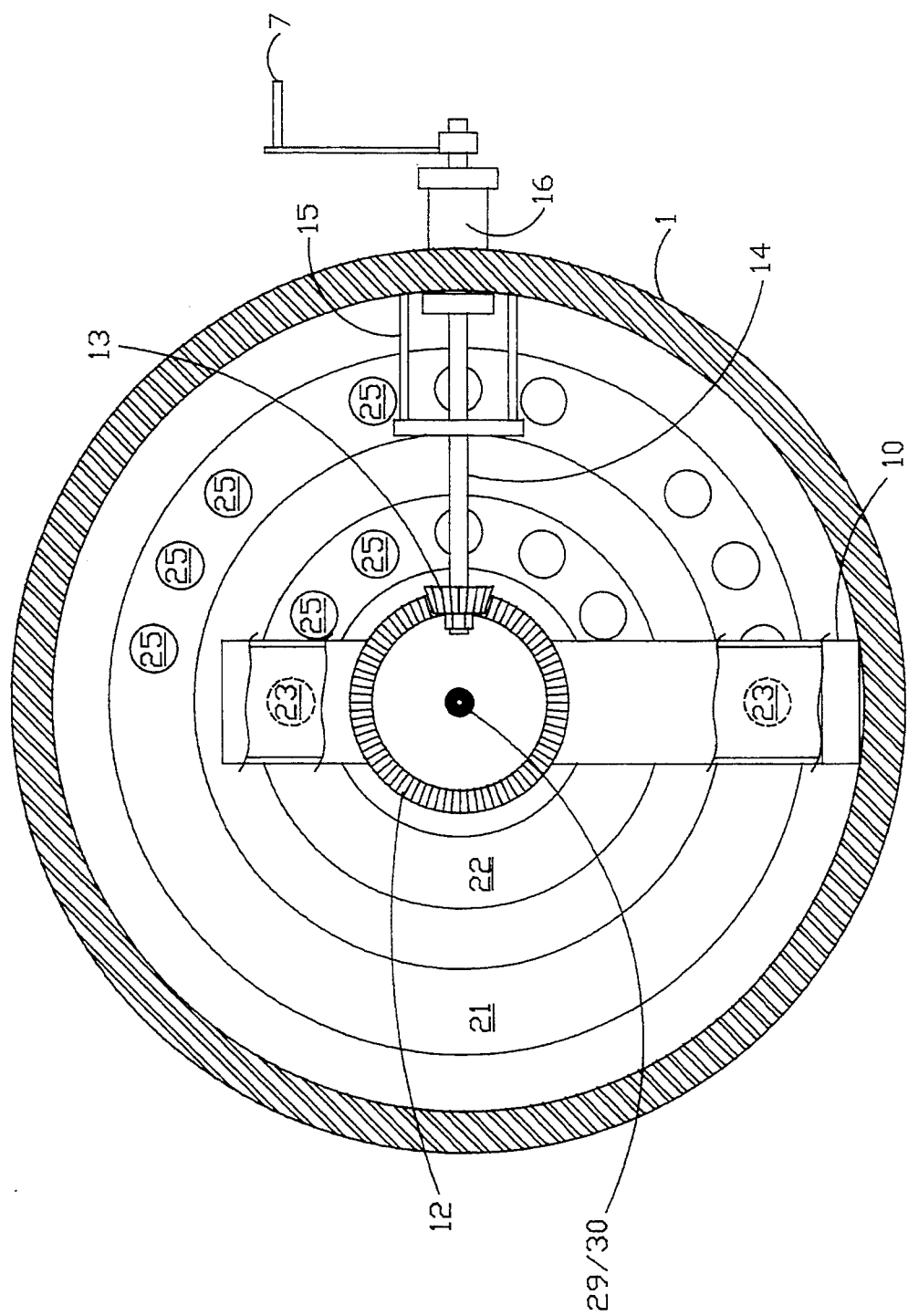
FIG. 3 shows the position of the support plate groove improvement in a filter-coalescer. If the device were a filter or filter-separator, then the entry-ports would extend completely around the support plate.
Figure 3A:
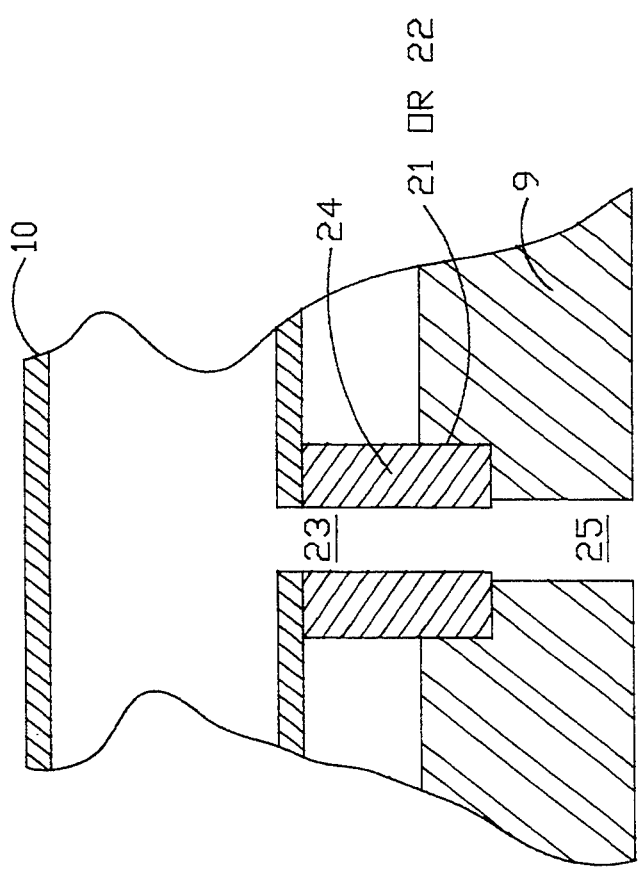
FIG. 3A is a cross-section taken through the manifold, the manifold pad, and the entry-port showing the interaction between the pad and the groove.
Figure 3B:
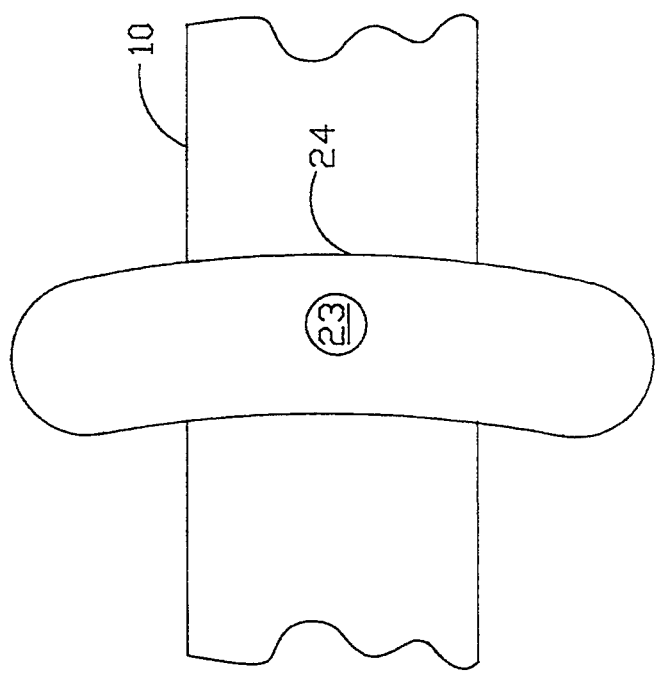
FIG. 3B is an enlarged plane view of the manifold pad mounted on the manifold illustrating the matching arc, of the tangential sides of the pad, for insertion in the groove.
Figure 3C:
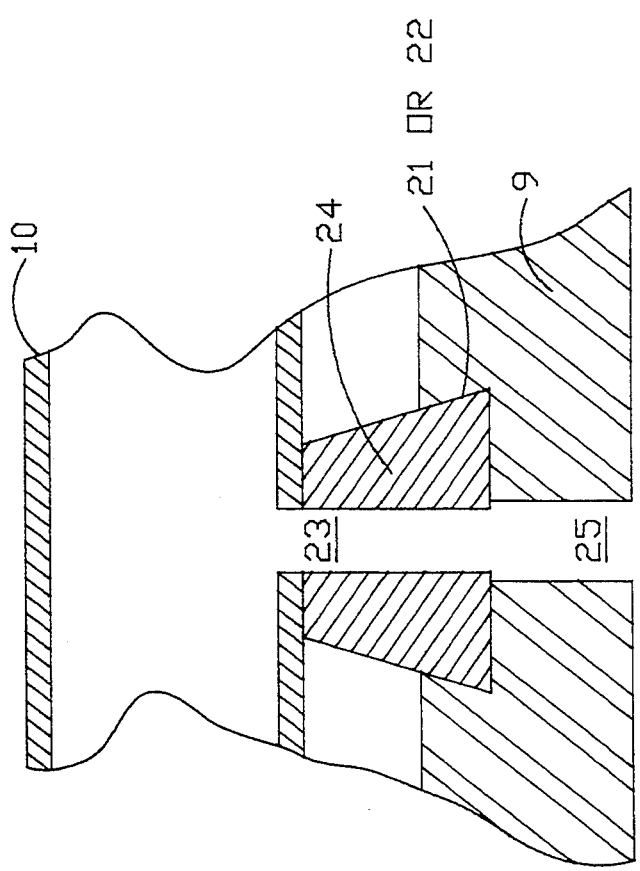
FIG. 3C is a cross-section taken through the manifold pad and entry port showing the dovetail configuration.

An improvement to reduce the leakage of gas about and around the pad is shown in FIGS. 2 and 3. A groove, 21 or 22, is carefully machined in the support plate and passes over the entry-ports, 25. Thus, the groove essentially has a base which passes over the entry-ports and extends slightly past each of the entry-ports in the radial direction. Associated with the groove are sides or walls which extend between the base of the groove and the face of the support plate. The sides or walls may be perpendicular to the base of the groove or angled relative to the base of the groove to form a dovetail configuration. The manifold pad, 24, has each of its tangential sides machined to match the sides of the groove(s) within the support plate. This means that gas passing in the radial direction (the least distance) must make two 90-degree turns. This tortuous path reduces the leakage rate. The larger path length in the tangential direction is not changed between the prior art and the instant invention because the leakage rate is low due to that larger path length.

An alternate embodiment of the improvement, in large vessels, to reduce gas leakage about the manifold pad is shown FIGS. 6 through 11. As previously stated, it is very difficult to machine grooves in a large support plate and an alternate method of reducing the gas leakage must be used particularly in the filter-coalescer because the manifold is not pressure balanced over the entry-ports.

First, turning to FIG. 4, the concept of pressure balance will be explained. In a regular filter device, the filter elements are arranged completely around the support plate. Thus, the pads on the manifold, which are located at each of the manifold, will be positioned over an entry-port during the self-cleaning operation. In other words, there would be additional entry-ports and associated elements at points $E_1$ and $E_2$ as shown in FIG. 4. Thus, when the back flow valve is opened, balanced pressures will appear at both ends of the manifold and, remembering that the pressure on the inlet is higher than the pressure on the outlet, both ends of the manifold will be pressed against the support plate. Gas can still leak around and about the pads in the manner previously described.

Figure 7:
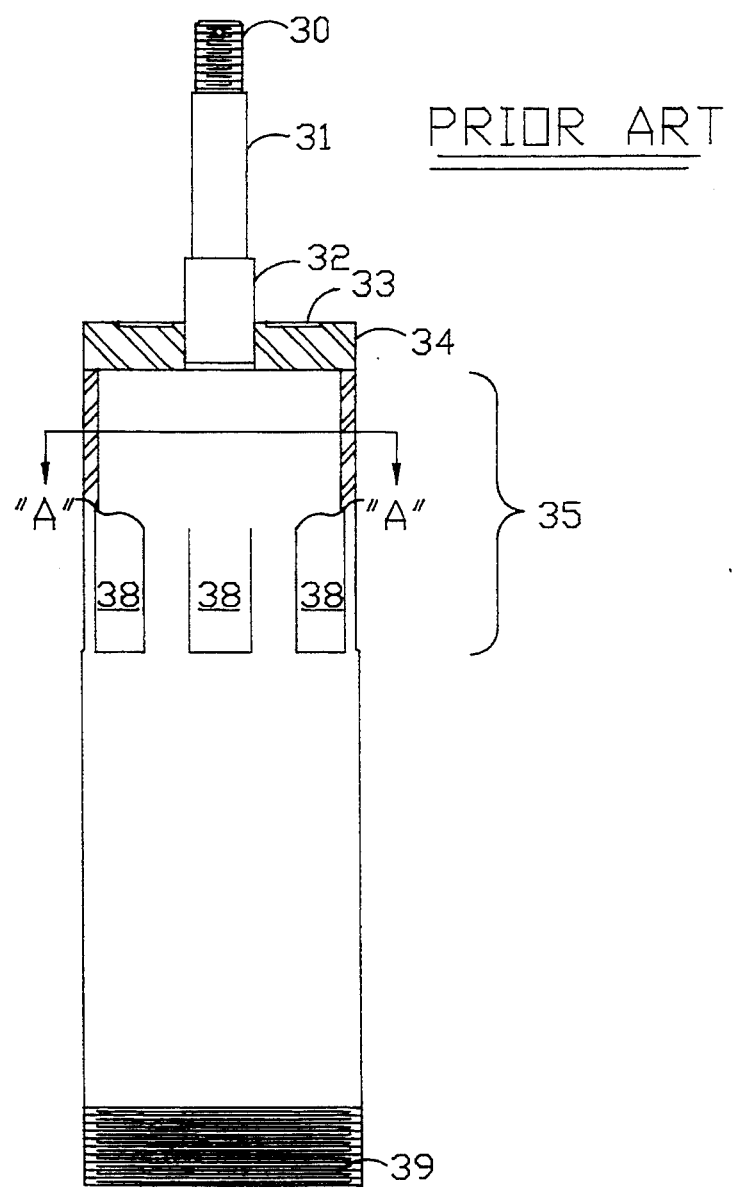
FIG. 7 is the prior art, multiple window cage, of FIG. 6.
Figure 7A:
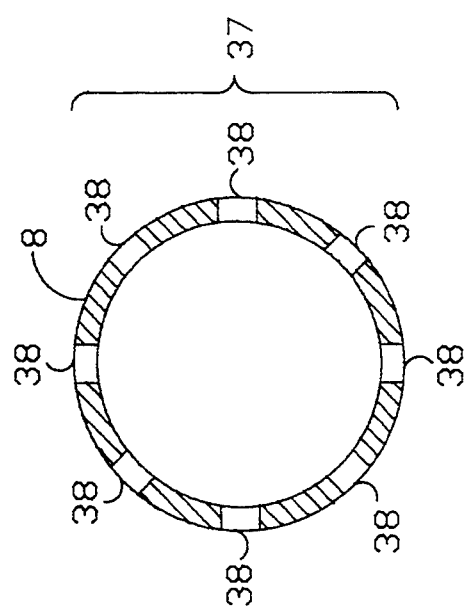
FIG. 7A is a cross-section of FIG. 7 taken at "A—A" showing the multiple window cage.
Figure 9:
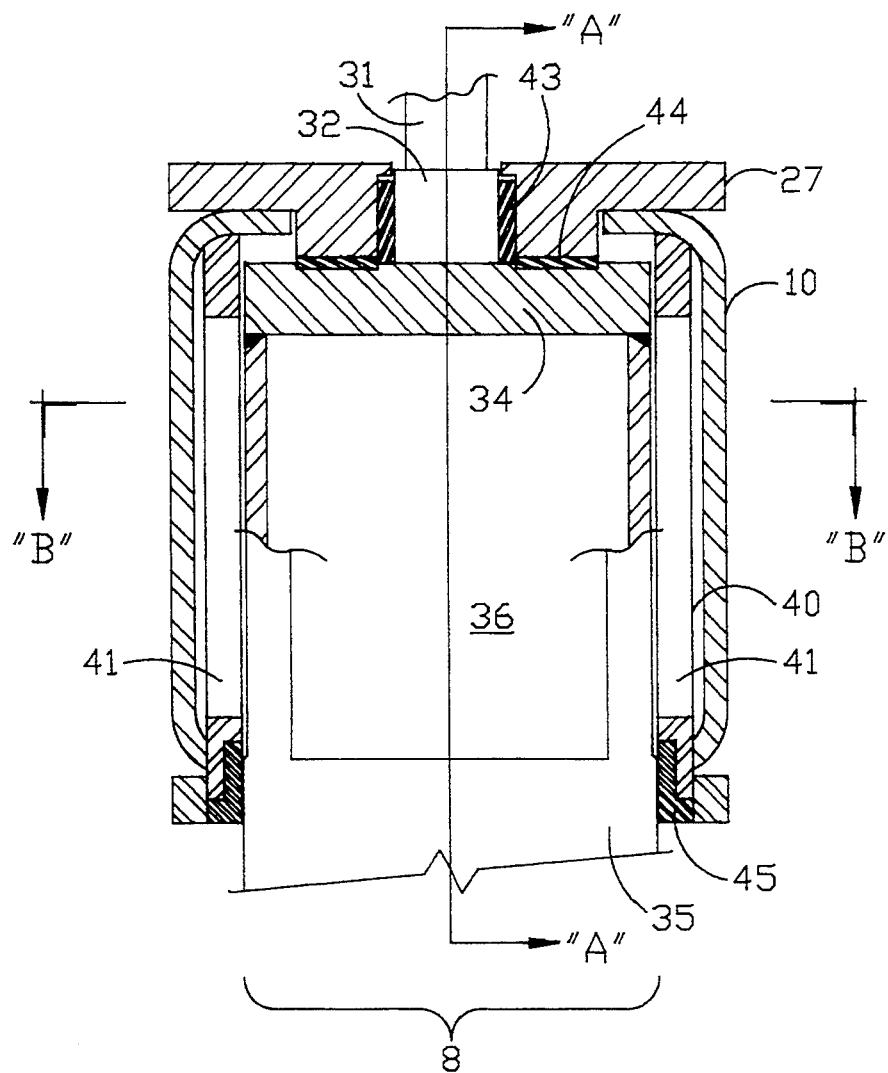
FIG. 9 is an elevational view of the improved pivot support tube and the pivot window in place within the manifold cage. Also shown are the manifold cage window and the position of all manifold seals.
Figure 10:
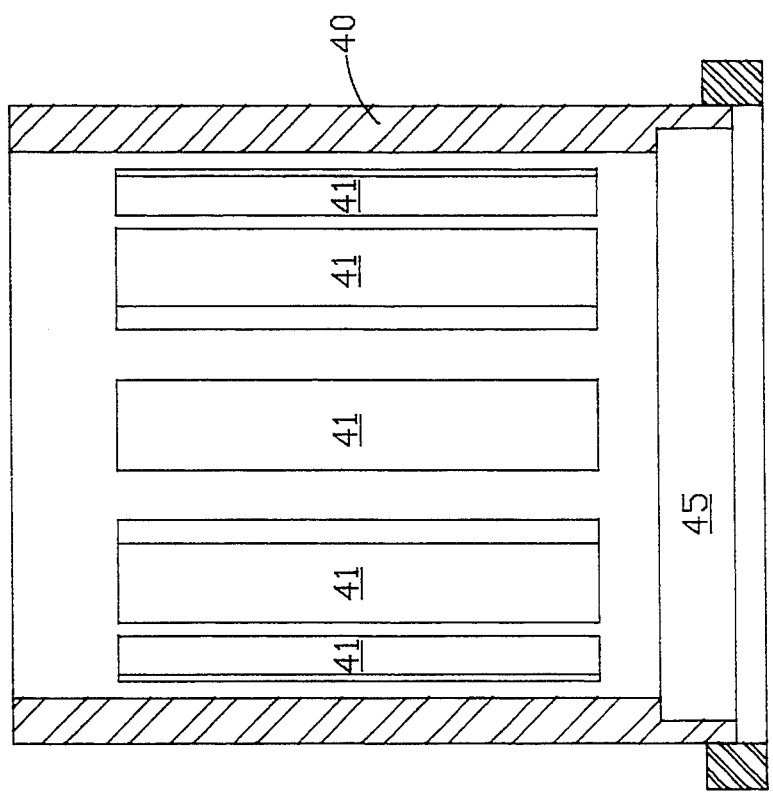
FIG. 10 is an elevational view showing the manifold cage windows and the manifold to support plate seal.
Figure 11:
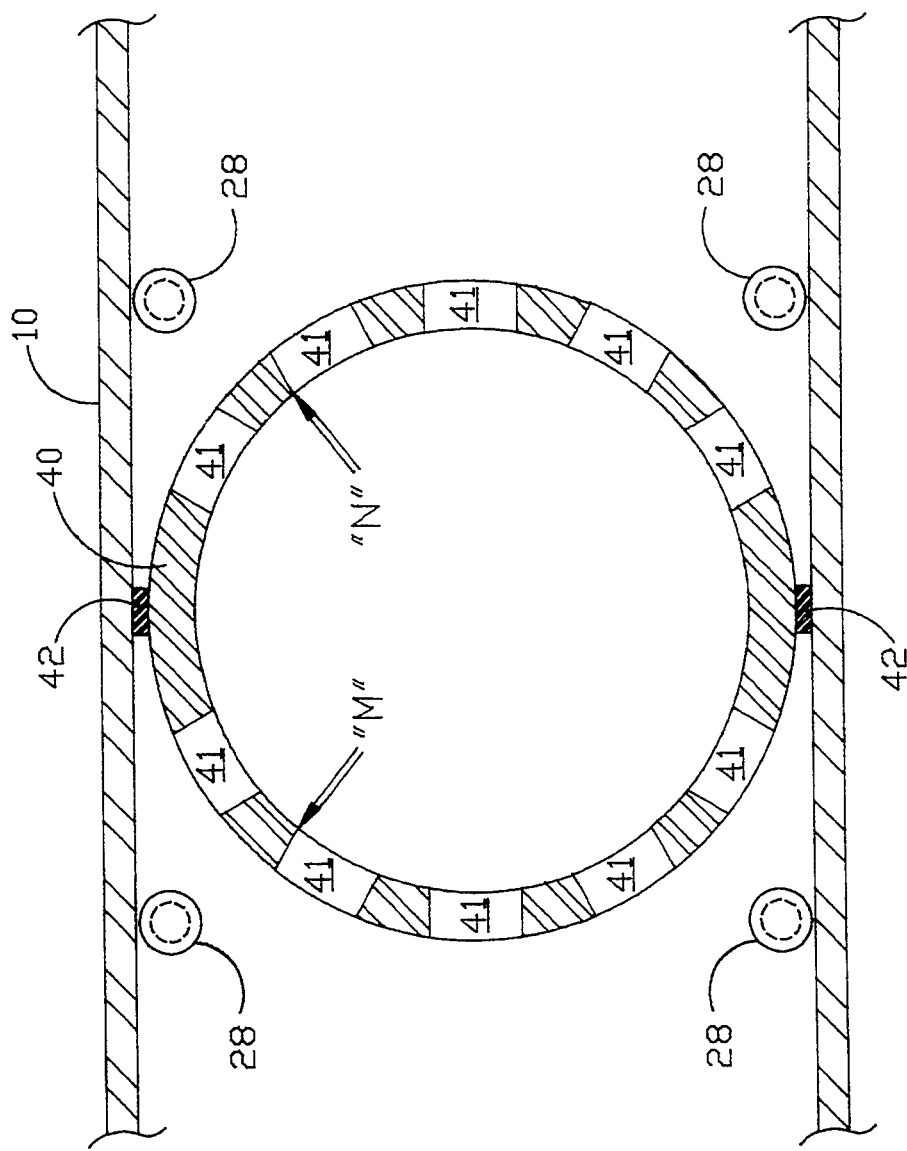
FIG. 11 is a cross-section of the manifold taken at "B—B" in FIG. 9 showing an improvement within the manifold.

In the filter-coalescer there are no elements at points $E_1$ and $E_2$ and the pressure balance described above will not occur. In fact, the pads that are located over non-existing entry-ports will tend to ride up and away from the support plate, thus, allowing more gas to escape. This particular problem can be resolved by changing the manifold and pivot bearing cages and by adding an internal block (or seal) within the manifold so that the pads that find themselves located over non-existing entry-ports are themselves blocked within the manifold. As the manifold pads rotate, such that they are now located over entry-ports, then they can communicate with the back flow line, 11. The prior art uses a multiple window cage/bearings as shown in FIGS. 7 and 11 which will not provide the necessary blocking action within the manifold. In fact, the prior art requires that no blocking occur for ease and simplicity of construction. (FIG. 9 shows the prior art cage used in a manifold which is still used in the instant invention.)

A cage bearing consists of a bearing surface with a plurality of openings. FIG. 7 (prior art) shows the cage bearing surface, 37, on the central pivot, 8. The plurality of openings are shown as 38. The interaction between the pivot cage bearing surface and the manifold cage bearing, 34, is illustrated in FIG. 9 which actually shows the improved pivot. The manifold cage windows, 41, and the pivot cage windows, 38, permit gas to flow through those windows and into the central pivot no matter what the position of the manifold about the pivot. That is, gas flow is never blocked by the plurality of windows. This :method of forming a pair of bearing cages means that little attention need be paid to machining and positioning of the parts because no matter what happens, gas can still pass through the bearing. FIG. 11 shows how gas can pass from one side of the manifold to the other around and about the manifold cage bearing, 40, because there is a deliberate gap between the internal walls of the manifold and the bearing at points, G.

Figure 6:
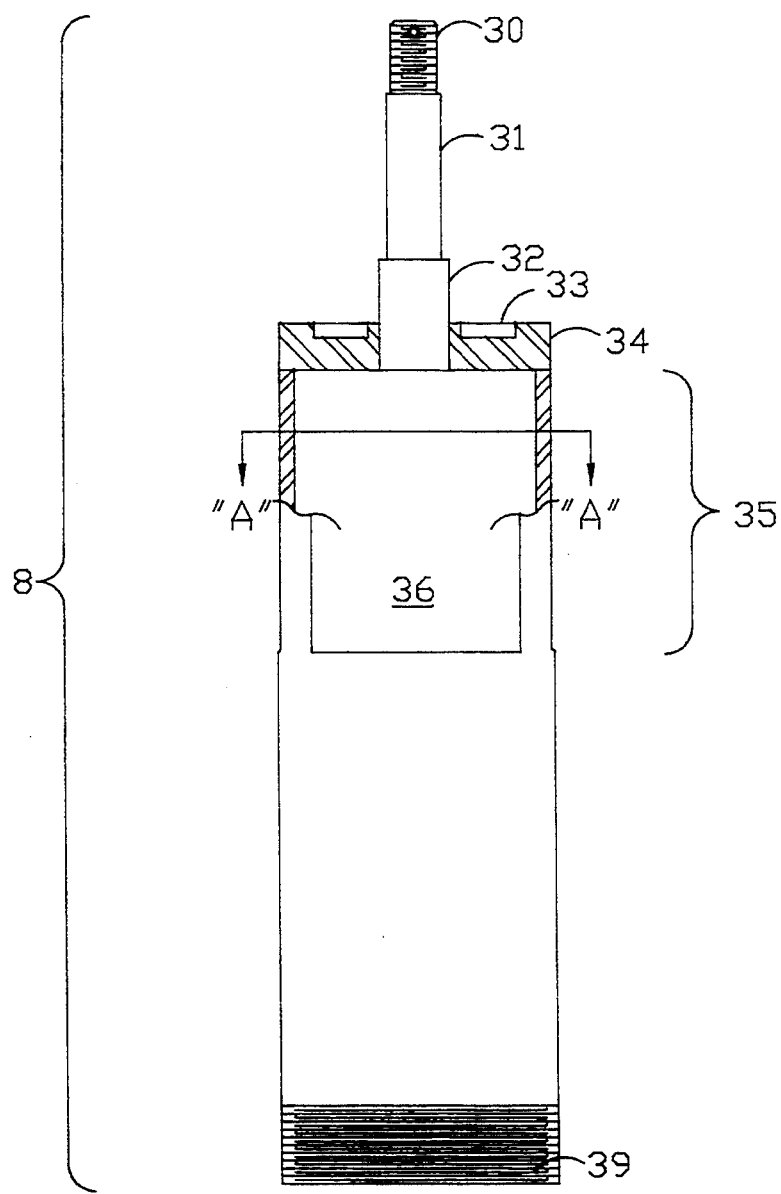
FIG. 6 shows the improved pivot support tube in which only one window cage is provided.
Figure 6A:
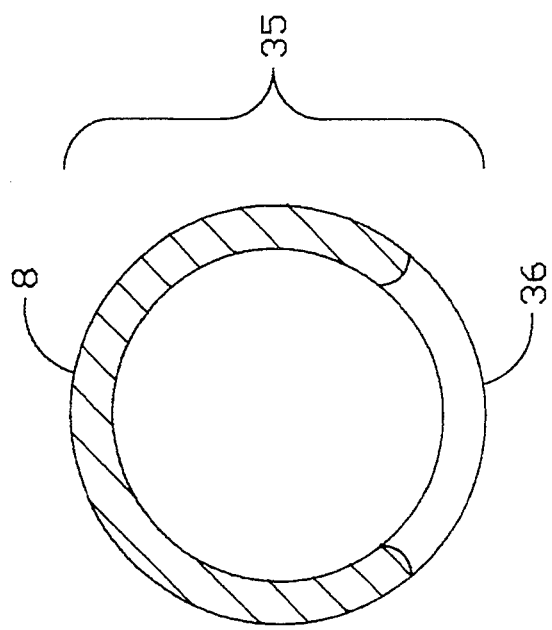
FIG. 6A is a cross-section of FIG. 6 taken at "A—A" showing the single window.
Figure 8:
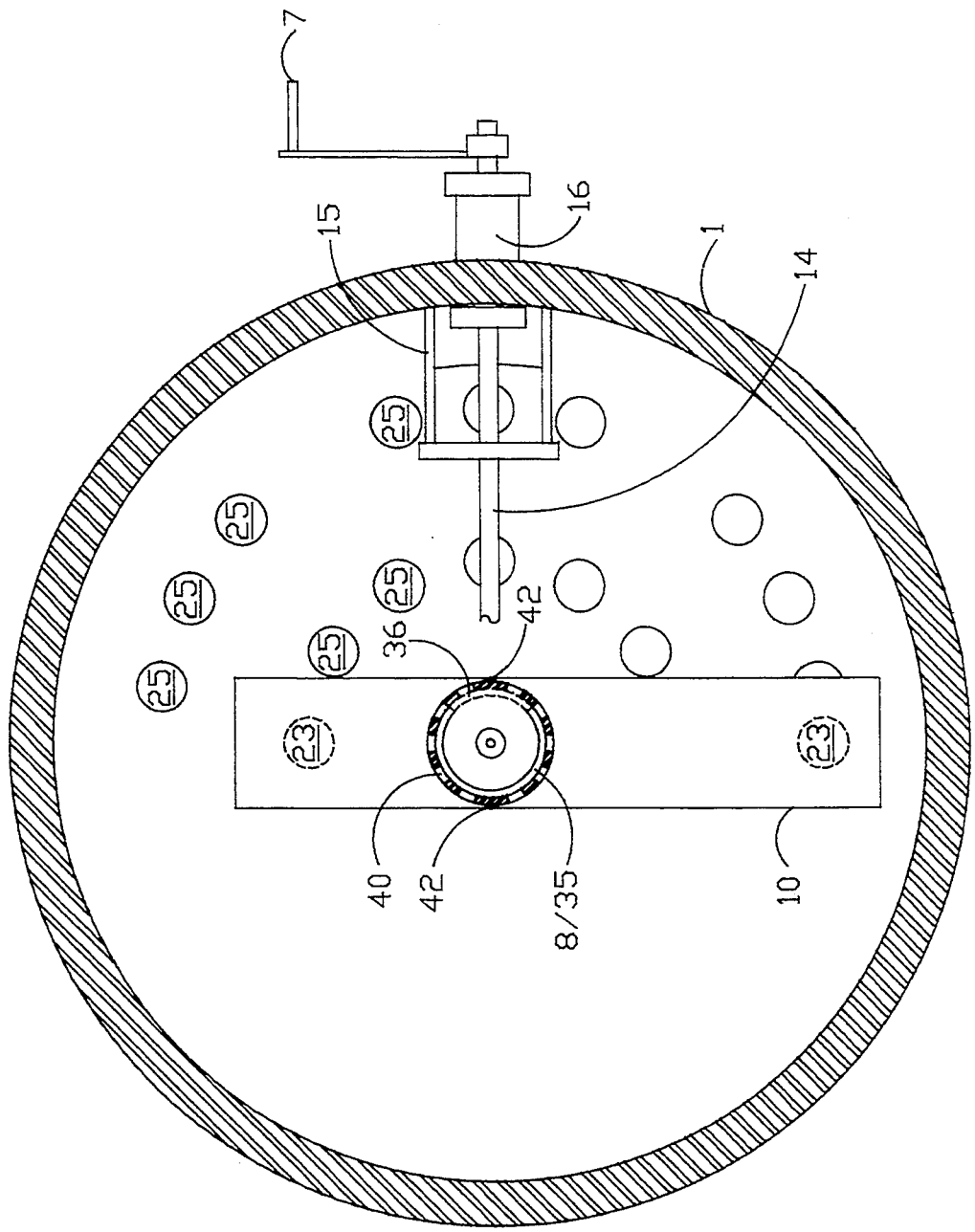
FIG. 8 is a cut-away illustration of the manifold in place on the support plate showing how the improved pivot single window cage interacts with the manifold cage and the improvement to the manifold to reduce gas loss.

FIG. 6 illustrates part of the alternate embodiment of the improvement to reduce gas leakage in a large filter-coalescer. The central pivot, 8, is manufactured with a single window, 36, in the cage bearing surface. This central pivot, 8, is carefully positioned during manufacture so that the single window, 36, is aligned with the mid-point of the arc in the support plate about which the elements are arranged. FIG. 8 can be used to fully illustrate this point.

Figure 12:
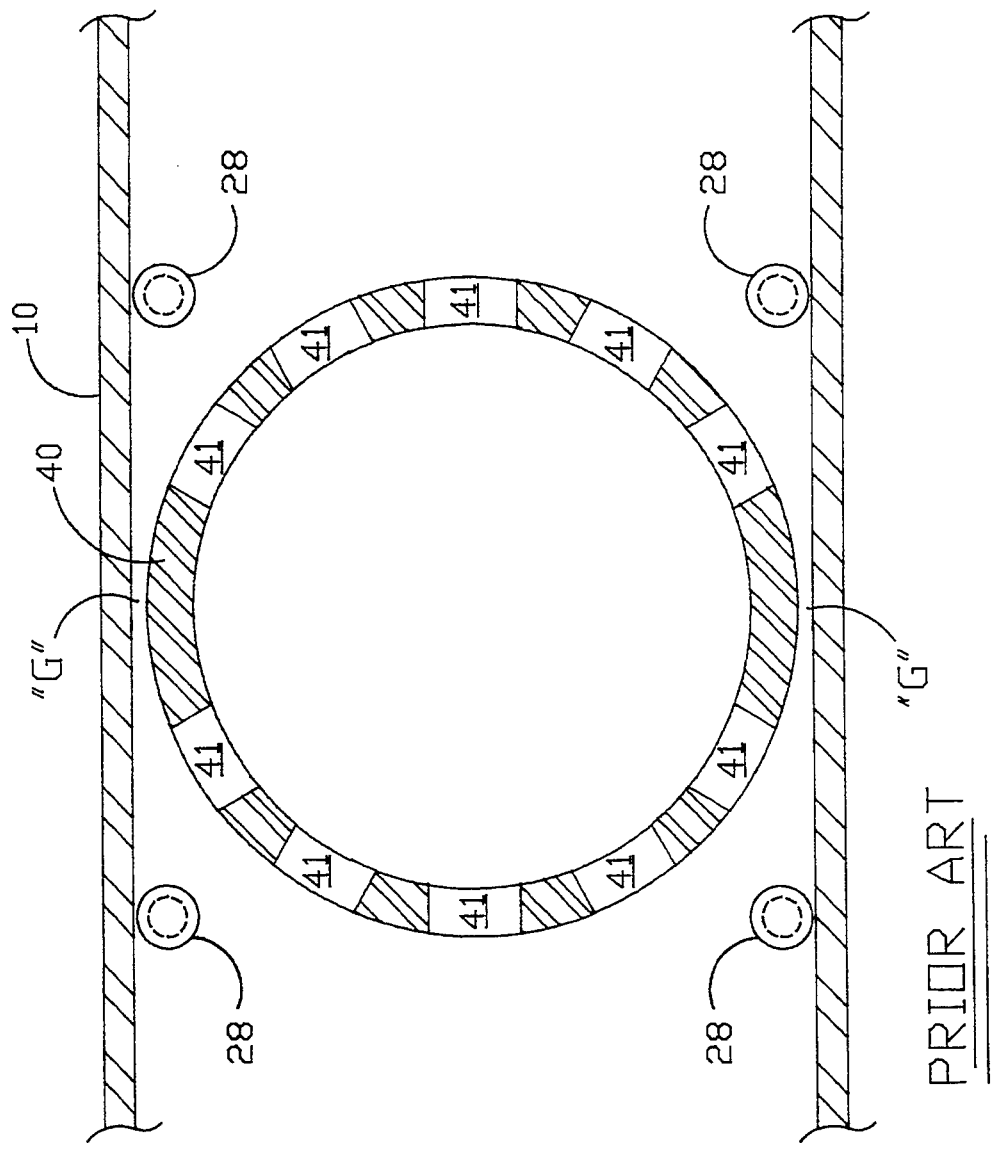
FIG. 12 is a cross-section of the manifold taken at "B—B" in FIG. 9 showing the prior art without an improvement within the manifold.

FIG. 8 shows the support plate for a filter-coalescer. The entry-ports, 25, are arranged in two arcs about the central pivot. The mid-point of this arc is immediately below the drive shaft, 14, used to rotate the manifold. Thus, in the improvement, the pivot window, 36, is positioned to face along the same axis occupied by the drive shaft, 14. The single opening in the pivot window is arranged so that, when the manifold is parked, the edges of the pivot window align with the second pail two windows, at points M and N, on the manifold cage. (See FIG. 11) As the manifold is rotated to align the manifold pad opening, 23, with the first of the entry-ports, 25, the manifold cage windows on the side opposite the entry-port to be cleaned are blocked. The manifold cage windows are blocked by the central pivot. Any gas that would move along the opening "G" in the unimproved manifold (See FIG. 12) are blocked by seals 42 as shown in FIG. 11. It should be noted that this particular embodiment of the improvement to reduce gas loss consists of two parts: the modified central pivot single gage window and the additional seals, 42, that close off the gap between the manifold cage and the interior walls of the manifold.

In designing the improvements to reduce the loss of gas within these devices during the self cleaning cycle, considerable thought was given to the seal systems. The prior art uses malleable cast iron seals as shown in FIG. 9. There are three seals associated with the rotating manifold in both the unimproved device and the improved device. These seals are:
 the pivot bearing and seal, 43,
 the thrust bearing and seal, 44, and
 the manifold to support plate seal, 45.
The current art uses malleable cast iron because that material can readily carry a mechanical load and provide a reasonable seal. The malleable cast iron seals can also handle particle impingement with minimum scoring of the sealing surface. It should be recognized that grit in the form of sand, rust and other similar impurities will be present in the input gas stream. The function of the filter is to remove these particles. The cast iron seal works quite well in "sweet" gas service, but, unfortunately, corrodes in "sour" gas service. These terms are well known in the industry; sour gas meaning gas containing hydrogen sulphide; sweet gas meaning gas without any trace of hydrogen sulphide.

Hydrogen sulphide $\{H_2S\}$ reacts in the presence of water $\{H_2O\}$ to form Sulphuric Acid $\{H_2SO_4\}$. The sulphuric acid so formed reacts with the iron $\{Fe\}$ to form iron oxide $\{RUST\}$ and water. Iron oxide is larger than the iron that it replaces, thus, bearing seal, 43, will expand and freeze the entire assembly. Additionally, the corrosion $\{rust\}$ will cause the seals to pit and become ineffective: gas waste increases. Therefore, it follows that the improvement to reduce gas waste must consider the internal seals.

It is not a simple matter to decide to replace one seal material with another. In these devices two of the seals serve a dual purpose; they carry a mechanical load and provide a gas seal. The two load bearing seals are the bearing seal, 43, and the thrust seal, 44. A material has to be found and experimented with that would serve both mechanical and seal functions. Nitrile (a butyl rubber) was found to have the required properties. The mechanical properties of this material was considered and the areas within both the central pivot and the manifold which received these improved seals/bearing was slightly :modified from the prior art to provide for greater seal/bearing material. It has been found that the nitrile seal must be approximately 30 percent larger than the former cast iron seal. This is due to the differences in density and strength of the two materials.

The manifold to support seal, 45, is a slightly simpler matter to improve because that seal does not carry a mechanical load. However, the seal must remain in place. In the case of malleable cast iron the seal housing can be a simple circular groove cut in the manifold. The nitrile, being much more pliable than the cast iron, will jump out of a simple circular groove. The improved housing must then allow the quantity of seal material to increase without reducing the strength of the manifold. The manifold to support plate seal, 43, is housed in an elongated housing consisting of a lower simple groove and an upper groove. This means that the nitrile seal itself will have a right angle formed within itself. This right-angle shape will make the nitrile ring stiffer, somewhat like the right angle that is formed in "angle-iron."

It is possible to "retrofit" the improved seals in the field. In order to accomplish a retrofit the rotatable manifold must be removed from the device. Removal of the manifold requires that the device be isolated from the gas system and that the entry (inlet) piping be removed from the inlet nozzle, 2. The manifold can be withdrawn through the open inlet nozzle. The original malleable cast iron seals and bearings, 43, 44, and 45, are bored out using standard machine techniques. The bearing surfaces are machined to approximately 30 percent oversize to receive the larger nitrile replacements. The manifold is them replaced; any mechanical problems, that can be noticed while the vessel is open, resolved; and the improved device returned to service Finally, although not directly related to reducing the loss of gas during the cleaning cycle, a way to increase the life of the elements was required because it was noted that during the cleaning cycle, elements would fail. Failure of these elements, in the long run, results in loss of gas. Investigation showed that the failure is caused by a high reverse flow of gas during the cleaning cycle. It was noted that, when the reverse gas flow starts through a set of elements (remember that in large units the elements appear in alternating rows about the central axis), it is within limits. As the element(s) release the entrained particles, the flow dramatically increases. It is known that rapid flow (forward or reverse) through an element can mechanically destroy the element.

The pressure, within the pressure vessel, of the gas on the "clean side" provides the energy to move the gas backward through an element. Due to the resistance of the element to gas flow, a differential pressure, between the inner and outer walls of the element, will exist and can be measured. The back flow control valve and piping are connected to a low pressure system (generally atmospheric). The internal and external pressures are fixed and, therefore, some method must be used to restrict the reverse flow of the cleaning gas during the cleaning cycle.

Figure 13:
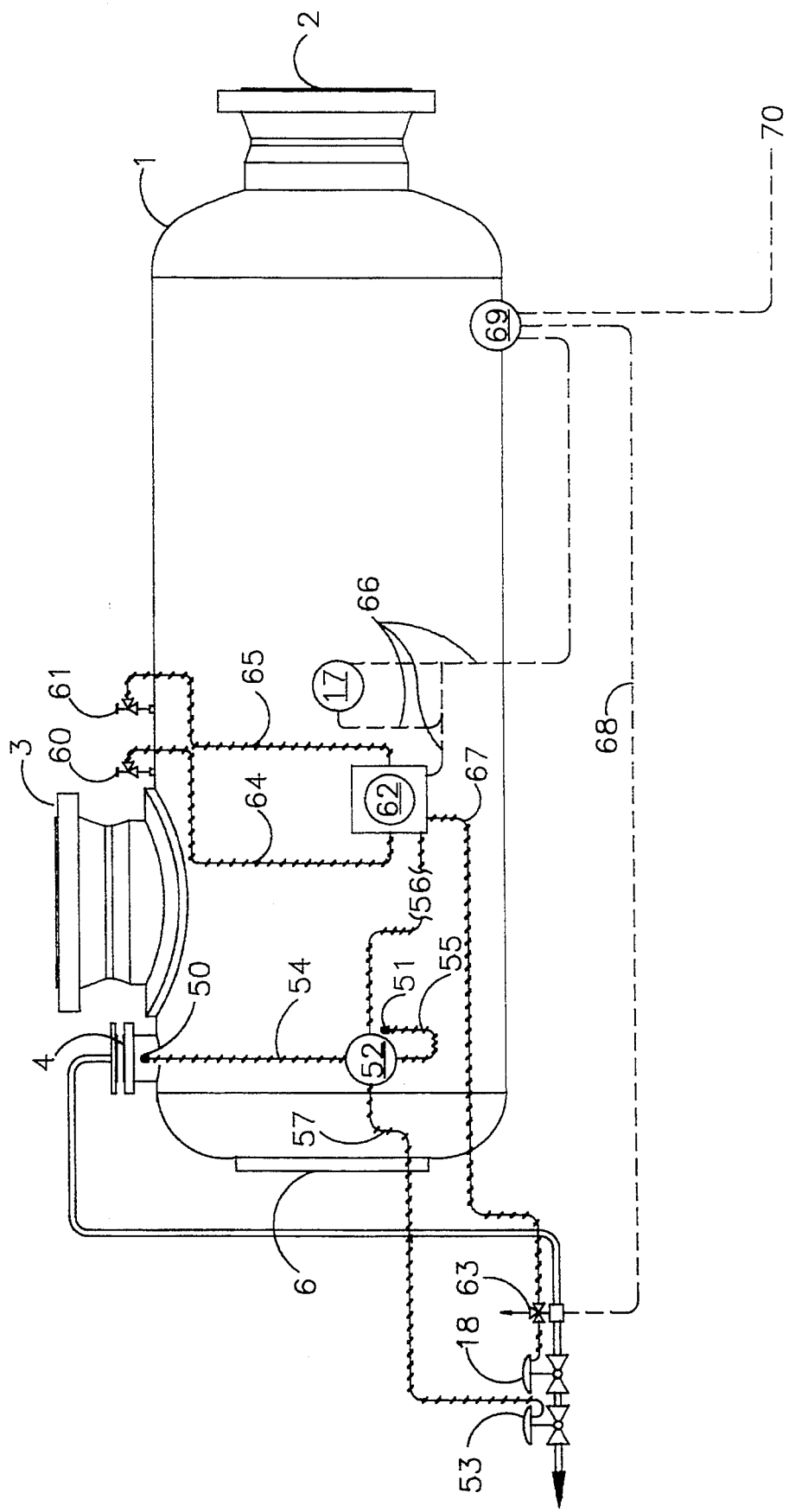
FIG. 13 is a Process and Instrumentation Diagram showing the control scheme for velocity control of the back flow element cleaning gas as well as options for automatic cleaning.

In FIG. 13, a second control valve, a back flow velocity control valve, 53, has been added to the back flow piping of the present art. The differential pressure across the element (or elements) being cleaned is sensed by a differential pressure controller, 52. The low pressure sense line, 54, is tied to the low pressure sense port, 50. Low pressure will occur at the back flow output nozzle. The high pressure sense port, 51, is taken at any point within the clean side of the pressure vessel and high pressure sense piping, 55 is tied to the controller, 52. The output of the controller is routed to the back flow velocity control valve through a control line, 57. The controller receives instrument air or instrument gas from line 56. It is possible to tie this supply of air or gas to the safety system if so desired.

Whenever the self-cleaning operation is activated, the back flow shut off valve, 18, is opened through a safety system and the differential controller is enabled. The manifold is rotated manually (via the handcrank 7) or automatically (as shown in FIG. 13), the manifold pads will align with an entry-port (or set of entry-ports), and reverse gas flow from the clean side of the pressure vessel through the back flow piping will occur. A differential pressure across the element(s) being clean will immediately occur. The differential pressure controller will sense this differential pressure and modulate the back flow velocity control valve to keep the differential pressure within prescribed limits. This process continues as the manifold rotates across all the elements in sequence.

Another improvement is shown in FIG. 13, wherein the cleaning cycle is automatically determined, thus, reducing gas waste. Here a differential switch monitors the pressure difference between the dirty side, 61, and the clean side, 60, of the pressure vessel. When that differential pressure reaches a prescribed value, the switch enables the safety system/drive motor controller, 69, which in turn activates the back flow shut off valve, 18, enables the differential pressure controller, 52, and automatically and safely governs the self-cleaning operation. The differential pressure control switch also monitors the internal pressure of the vessel, and if it drops below a prescribed limit, then the back flow shut off is closed and the manifold frozen in place. When the pressure recovers, the self-cleaning cycle is re-started. This pressure monitoring operation will repeat itself as necessary. This control scheme ensures that no process upsets will be felt downstream of the device which is essential in most processes. Instead of the automatic system described above, manual rotation of the manifold is initiated whenever the differential pressure indicator, 59, shows high pressure drop across the elements.

There has been disclosed heretofore in the above discussion the best embodiment and best mode of the present invention presently contemplated. It is to be understood that the examples given and the dimensions may be changed, that dimensions are based on strength properties of the material chosen to manufacture the instant invention, and that modifications can be made thereto without departing from the spirit of the present invention.

We claim:

1. An improvement to reduce the waste of gas within a Self-cleaning Gas Filtering Apparatus having an internal rotatable manifold, manifold pads each having a top and a bottom and each being attached at the top thereof to the rotatable manifold, a support plate, and element entry-ports circumferentially arranged within the support plate and wherein the improvement comprises;

forming a groove, having a base and walls, that passes circumferentially over the entry-ports and extends radially past the entry-ports, such that the manifold pads ride within said groove forming a primary seal between the bottom of the manifold pads and the base of said groove, and a secondary seal between the walls of said groove and the manifold pads.

2. The improvement to the Self-cleaning Gas Filtering Apparatus of claim 1, wherein said groove walls are perpendicular to said base of said groove.

3. The improvement to the Self-cleaning Gas Filtering Apparatus of claim 1, wherein said manifold pads are formed to match the configuration of the groove.

4. The improvement to the Self-cleaning Gas Filtering Apparatus of claim 3, wherein the said groove walls are angled to said base of said groove to form a dove tail configuration.

5. An improvement to reduce the waste of gas within a Self-cleaning Gas Filtering Apparatus having an internal rotatable manifold, a plurality of manifold pads each having a top, a bottom, and peripheral side walls, each being attached at the top thereof to the rotatable manifold, a support plate, a plurality of element entry-ports circumferentially arranged within the support plate, each entry-port in communication with an element, the manifold capable of receiving reverse flow of gas through selected element entry-ports thereby cleaning the selected elements and wherein the improvement comprises;

forming a groove, having a base and walls, that passes circumferentially over the entry-ports and extends radially past the entry-ports, such that the manifold pads ride within said groove forming a primary seal between the bottom of each of the manifold pads and the base of said groove and a secondary seal between the walls of said groove and the peripheral walls of each of the manifold pads which are in contact with said walls of said groove.

6. The improvement to the Self-cleaning Gas Filtering Apparatus of claim 5, wherein said groove walls are perpendicular to said base of said groove.

7. The improvement to the Self-cleaning Gas Filtering Apparatus of claim 5, wherein said manifold pads are formed to match the configuration of the groove.

8. The improvement to the Self-cleaning Gas Filtering Apparatus of claim 7, wherein the said groove walls are angled to said base of said groove to form a dove tail configuration.

9. The improvement to the Self-cleaning Gas Filtering Apparatus of claim 5, the Gas Filtering Apparatus further having filter elements attached to each of a plurality of element entry-ports utilizing reverse flow of clean gas through the filter element being cleaned wherein the improvement further comprises control means to regulate the reverse flow of cleaning gas.

10. The improvement to the Self-cleaning Gas Filtering Apparatus of claim 9 wherein said control means further comprises:
   differential pressure controller means sensing the differential pressure across the elements being cleaned;
   a backflow velocity control valve, controlled by said differential pressure controller, said backflow velocity control valve modulating the reverse gas flow through the elements being cleaned whereby said difference pressure is maintained within a predicted reverse flow differential pressure limit so as to prevent damage to the filter element.

11. An improvement to the Self-cleaning Gas Filtering Apparatus having an internal rotatable manifold, a plurality of manifold pads each having a top, a bottom, and peripheral side walls, each being attached at the top thereof to the rotatable manifold, a support plate having a central pivot point, an even plurality of concentrically arranged circumferential element entry-ports concentrically located about the central pivot point, each entry-port in communication with an element, the manifold rotating about the central pivot point and capable of receiving reverse flow of gas through the manifold pads riding over and along the concentric circumferentially arranged element entry-ports thereby selecting and cleaning elements in a pressure balanced condition and wherein the improvement comprises;
   forming a plurality of concentric grooves about the central pivot point, each having a base and walls, each passing circumferentially over the concentrically arranged circumferential element entry-ports and each extending radially past the entry-ports, such that a manifold pad rides within each of said grooves forming a primary seal between the bottom of each of the manifold pads and the base of each of said grooves and a secondary seal between the walls of each of said grooves and the peripheral walls of each of the manifold pads which are in contact with said walls of each of said grooves.

12. The improvement to the Self-cleaning Gas Filtering Apparatus of claim 11, wherein said groove walls are perpendicular to said base of said groove.

13. The improvement to the Self-cleaning Gas Filtering Apparatus of claim 11, wherein said manifold pads are formed to match the configuration of the groove.

14. The improvement to the Self-cleaning Gas Filtering Apparatus of claim 13, wherein the said groove walls are angled to said base of said groove to form a dove tail configuration.

* * * * *